US012583463B2

(12) United States Patent
Yamaguchi

(10) Patent No.: US 12,583,463 B2
(45) Date of Patent: Mar. 24, 2026

(54) INFORMATION PROCESSING DEVICE FOR VEHICLE, AND INFORMATION PROCESSING SYSTEM

(71) Applicant: TOYOTA JIDOSHA KABUSHIKI KAISHA, Toyota (JP)

(72) Inventor: Teruya Yamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 18/590,139

(22) Filed: Feb. 28, 2024

(65) Prior Publication Data

US 2024/0391471 A1    Nov. 28, 2024

(30) Foreign Application Priority Data

May 22, 2023    (JP) ................................. 2023-084087

(51) Int. Cl.
B60W 40/13        (2012.01)
H04W 4/44         (2018.01)
(52) U.S. Cl.
CPC .............. B60W 40/13 (2013.01); H04W 4/44 (2018.02); B60W 2520/105 (2013.01); B60W 2530/10 (2013.01); B60W 2552/15 (2020.02); B60W 2556/20 (2020.02); B60W 2556/45 (2020.02)

(58) Field of Classification Search
None
See application file for complete search history.

(56) References Cited

U.S. PATENT DOCUMENTS

2009/0240415 A1    9/2009   Sukaria
2019/0202434 A1    7/2019   Ito et al.
2021/0347369 A1*  11/2021   Owen ..................... F16H 59/52

FOREIGN PATENT DOCUMENTS

JP        2017-095030 A     6/2017
JP        2021143917 A  *  9/2021

* cited by examiner

*Primary Examiner* — Christian Chace
*Assistant Examiner* — Shayne M. Gilbertson
(74) *Attorney, Agent, or Firm* — Oliff PLC

(57)    ABSTRACT

An information processing device for a vehicle includes one or more processors configured to execute acquiring vehicle driving force that is driving force of the vehicle, acquiring front-rear acceleration that is an actual measurement value of acceleration along a front-rear axis of the vehicle from an acceleration sensor mounted on the vehicle, acquiring a slope at each point of a road on which the vehicle travels, and estimating an estimation value of total weight of the vehicle, when the vehicle travels at the point where the slope is acquired, based on the vehicle driving force at the point, the front-rear acceleration at the point, and the slope at the point.

6 Claims, 3 Drawing Sheets

INFORMATION PROCESSING DEVICE FOR VEHICLE, AND INFORMATION PROCESSING SYSTEM

CROSS-REFERENCE TO RELATED APPLICATION

This application claims priority to Japanese Patent Application No. 2023-084087 filed on May 22, 2023, incorporated herein by reference in its entirety.

BACKGROUND

1. Technical Field

The present disclosure relates to an information processing device for a vehicle and an information processing system.

2. Description of Related Art

A vehicle disclosed in Japanese Unexamined Patent Application Publication No. 2017-095030 (JP 2017-095030 A) includes an engine, a motor, a vehicle control device, and a navigation device. The vehicle control device controls the engine and the motor as driving sources. Also, the vehicle control device acquires a slope at each point on a travel route along which the vehicle travels from the navigation device. The vehicle control device determines, based on the acquired slope, whether the vehicle is traveling a downhill. Then, the vehicle control device changes driving force of the vehicle by the engine and the motor depending on whether the vehicle is traveling the downhill.

SUMMARY

In the vehicle such as that disclosed in JP 2017-095030 A, the total weight of the vehicle changes depending on, for example, the number of occupants boarding on the vehicle, the amount of goods loaded on the vehicle, and the like. When the total weight of the vehicle changes in this way, the actual front-rear acceleration and the like acquired by the vehicle changes, for example, even when the driving force of the vehicle is the same. In other words, dynamic characteristics of the vehicle change depending on a size of the total weight of the vehicle. Therefore, from a perspective of controlling the vehicle more accurately in accordance with the dynamic characteristics of the vehicle, there is a demand for understanding the total weight of the vehicle.

An information processing device for a vehicle according to the present disclosure includes one or more processors configured to execute acquiring vehicle driving force that is driving force of the vehicle, acquiring front-rear acceleration that is an actual measurement value of acceleration along a front-rear axis of the vehicle from an acceleration sensor mounted on the vehicle, acquiring a slope at each point of a road on which the vehicle travels, and estimating an estimation value of total weight of the vehicle, when the vehicle travels at the point where the slope is acquired, based on the vehicle driving force at the point, the front-rear acceleration at the point, and the slope at the point.

With the above configuration, the total weight of the vehicle can be accurately estimated by referring to the acquired slope of the road.

The information processing device may include one or more memories configured to store the estimation value. The processors may be configured to execute calculating a target driving force that is a target value of the vehicle driving force, calculating, when calculating the target driving force, the target driving force using a predetermined initial value of the total weight under a condition where the estimation value is not stored, and calculating, when calculating the target driving force, the target driving force using the estimation value instead of the initial value under a condition where the estimation value is stored.

When the front-rear acceleration acquired from the acceleration sensor is actual acceleration and a target value of the acceleration along the front-rear axis of the vehicle is target acceleration, the processors may be configured to execute calculating the target acceleration corresponding to the target driving force under the condition where the estimation value is stored, and evaluating reliability of the acquired slope, based on an absolute value of difference between the actual acceleration and the target acceleration.

Under a condition where the reliability of the slope is lower than a predetermined threshold value and the estimation value estimated using the slope is stored, the processors may be configured to execute calculating the target driving force using the initial value.

The processors may be configured to execute transmitting an evaluation result related to the reliability of the acquired slope to an outside.

The information processing system according to the present disclosure includes the information processing device for the vehicle and a server configured to perform wireless communication with the information processing device. The server is configured to execute acquiring a plurality of the evaluation results that are transmitted from respective information processing devices of a plurality of the vehicles, calculating an evaluation value indicating the reliability of the slope based on the acquired evaluation results, and notifying that the reliability of the slope is low when the calculated evaluation value is equal to or lower than a predetermined prescript value.

The server may be configured to link the evaluation value to the slope at each point and transmit the evaluation value to the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Schematic Configuration of Information Processing System

An embodiment of the present disclosure will be described below with reference to FIGS. 1 and 2. First, a schematic configuration of an information processing system 100 will be described.

Figure 1:
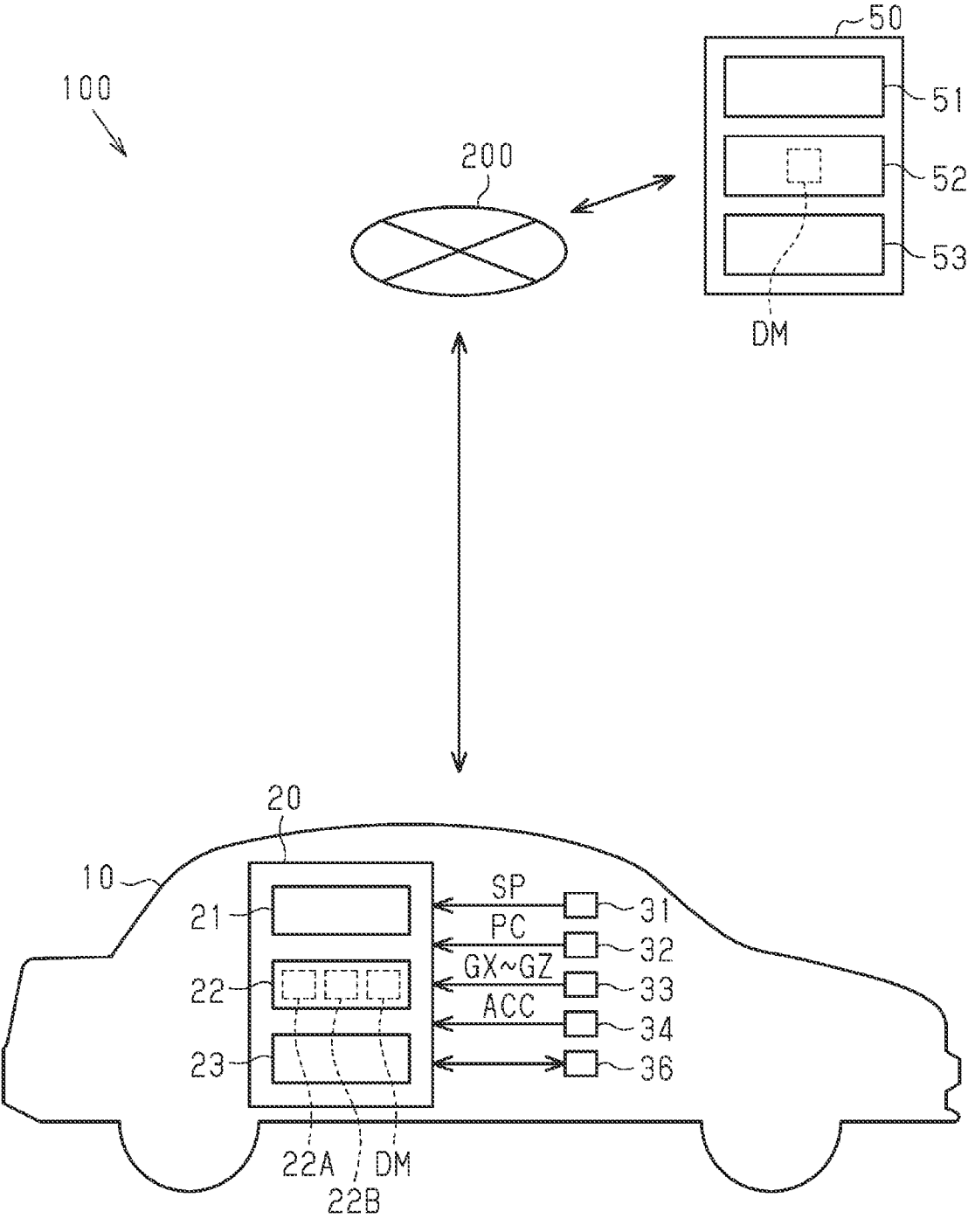
FIG. 1 is a schematic configuration diagram of an information processing system.

As shown in FIG. 1, the information processing system 100 includes one or more of a vehicle 10. The vehicle 10 is, for example, an automobile owned by a user. Note that in FIG. 1, only one vehicle 10 is shown as a representative.

The vehicle 10 includes a vehicle speed sensor 31, a GNSS receiver 32, an acceleration sensor 33, an accelerator operation amount sensor 34, and a display 36. The vehicle speed sensor 31 detects vehicle speed SP that is speed of the vehicle 10. The GNSS receiver 32 detects position coordinates PC that are coordinates at a point where the vehicle 10 is located, through communication with a GNSS satellite (not shown). Note that "GNSS" is an abbreviation for a global navigation satellite system.

The acceleration sensor 33 is a so-called three-axis sensor. That is, the acceleration sensor 33 can detect front-rear acceleration GX, lateral acceleration GY, and vertical acceleration GZ. The front-rear acceleration GX is acceleration along a front-rear axis of the vehicle 10. The lateral acceleration GY is acceleration along a lateral axis of the vehicle 10. The vertical acceleration GZ is acceleration along a vertical axis of the vehicle 10. In the present embodiment, the front-rear acceleration GX is an actual measurement value of the acceleration along the front-rear axis of the vehicle 10.

The accelerator operation amount sensor 34 detects accelerator operation amount ACC that is the operation amount of an accelerator pedal operated by a driver of the vehicle 10. The display 36 can display various categories of information. Further, the display 36 is a so-called touch panel display. Therefore, the user can also input various categories of information via the display 36.

The vehicle 10 includes a control device 20. The control device 20 acquires signals indicating various values and the like from the vehicle speed sensor 31, the GNSS receiver 32, the acceleration sensor 33, the accelerator operation amount sensor 34, and the display 36. Further, the control device 20 outputs a control signal to the display 36 when displaying various categories of information on the display 36.

The control device 20 includes an execution unit 21, a storage unit 22, and a communication unit 23. The communication unit 23 is able to perform wireless communication with equipment outside the vehicle 10 via a communication network 200. The storage unit 22 includes read only memory (ROM) that can only be read, volatile random access memory (RAM) that can be read and written, and non-volatile storage that can be read and written. One or more memories may be used as the storage unit 22. The storage unit 22 can store information acquired by the control device 20 and the like. Furthermore, the storage unit 22 stores various programs in advance. Here, examples of various programs are an information processing program 22A and a driving assistance application 22B. Note that the information processing program 22A is a program for realizing a function of an information processing device. In the present embodiment, the control device 20 is an example of the information processing device for the vehicle 10. Further, the driving assistance application 22B is application software that realizes a driving assistance function of the vehicle 10. Note that an example of the driving assistance application 22B is application software for following traveling in which the vehicle 10 travels while maintaining a constant inter-vehicle distance with a preceding vehicle that travels ahead of the vehicle 10. In the present embodiment, the driving assistance application 22B realizes the driving assistance function of the vehicle 10 by outputting a required acceleration that is a required value of the acceleration along the front-rear axis of the vehicle 10, and the like. Furthermore, the storage unit 22 stores map data DM in advance. The map data DM includes information on a route of the road, and information on a slope of the road. The information on the route of the road is, for example, link data that connects two different coordinates. Further, the information on the slope of the road is data on a road surface slope AR that is the slope at each point on the road. In the present embodiment, each point associated with the road surface slope AR is a specific area within a predetermined range. Note that the specific area is, for example, an area ranging from several meters to more than ten meters. Furthermore, the storage unit 22 stores in advance an initial value MA of the total weight M of the vehicle 10. An example of the execution unit 21 is a central processing unit (CPU). The execution unit 21 executes various processes by reading the programs in the storage unit 22. One or more processors may be used as the execution unit 21. Furthermore, the execution unit 21 can acquire the road surface slope AR for each point included in the map data DM from the map data DM.

The execution unit 21 of the control device 20 calculates target driving force FT that is a target value of the driving force of the vehicle 10, based on the vehicle speed SP, the accelerator operation amount ACC, the required acceleration from the driving assistance application 22B, the total weight M of the vehicle 10, and the like. For example, in a situation where the driver of the vehicle 10 is operating the accelerator pedal and the like, the execution unit 21 calculates the target driving force FT based on the vehicle speed SP, the accelerator operation amount ACC, and the total weight M. Further, for example, in a situation where the driving assistance for the vehicle 10 is realized, the execution unit 21 calculates the target driving force FT based on the required acceleration from the driving assistance application 22B and the total weight M. Then, for example, when an estimation value MB of the total weight M is not stored in the storage unit 22 in the case where estimation control described later is not executed, the execution unit 21 calculates the target driving force FT using the predetermined initial value MA of the total weight M as the total weight M. In contrast, for example, when the estimation value MB of the total weight M is stored in the storage unit 22 in the case where estimation control described later is executed, the execution unit 21 calculates the target driving force FT using the estimation value MB instead of the initial value MA as the total weight M. Note that the driving force of the vehicle 10 is force that is transmitted from driving wheels of the vehicle 10 to the road surface in order to drive the vehicle 10.

As shown in FIG. 1, the information processing system 100 includes a server 50. The server 50 includes an execution unit 51, a storage unit 52, and a communication unit 53. The communication unit 53 is able to perform wireless communication with equipment outside the server 50 via the communication network 200. The storage unit 52 includes ROM, RAM, and storage. The storage unit 52 can store information acquired by the server 50 and the like. Further, the storage unit 52 stores various programs in advance. Furthermore, the storage unit 52 stores the map data DM in advance. Note that by executing acquisition control described later, the map data DM in the storage unit 52 of the server 50 matches the map data DM in the storage unit 22 of the vehicle 10. An example of the execution unit 51 is a CPU. The execution unit 51 executes various processes by reading the programs in the storage unit 52.

Acquisition Control

Next, the acquisition control executed by the vehicle 10 and the server 50 will be described with reference to FIG. 2. The acquisition control is control for the control device 20 of the vehicle 10 to acquire the map data DM from the server 50. The acquisition control is executed between a plurality of the vehicle 10 and the single server 50 in parallel. In the present embodiment, the control device 20 of the vehicle 10 executes the acquisition control as the driver of the vehicle 10 and the like operates the display 36 and the execution of the acquisition control is required.

Figure 2:
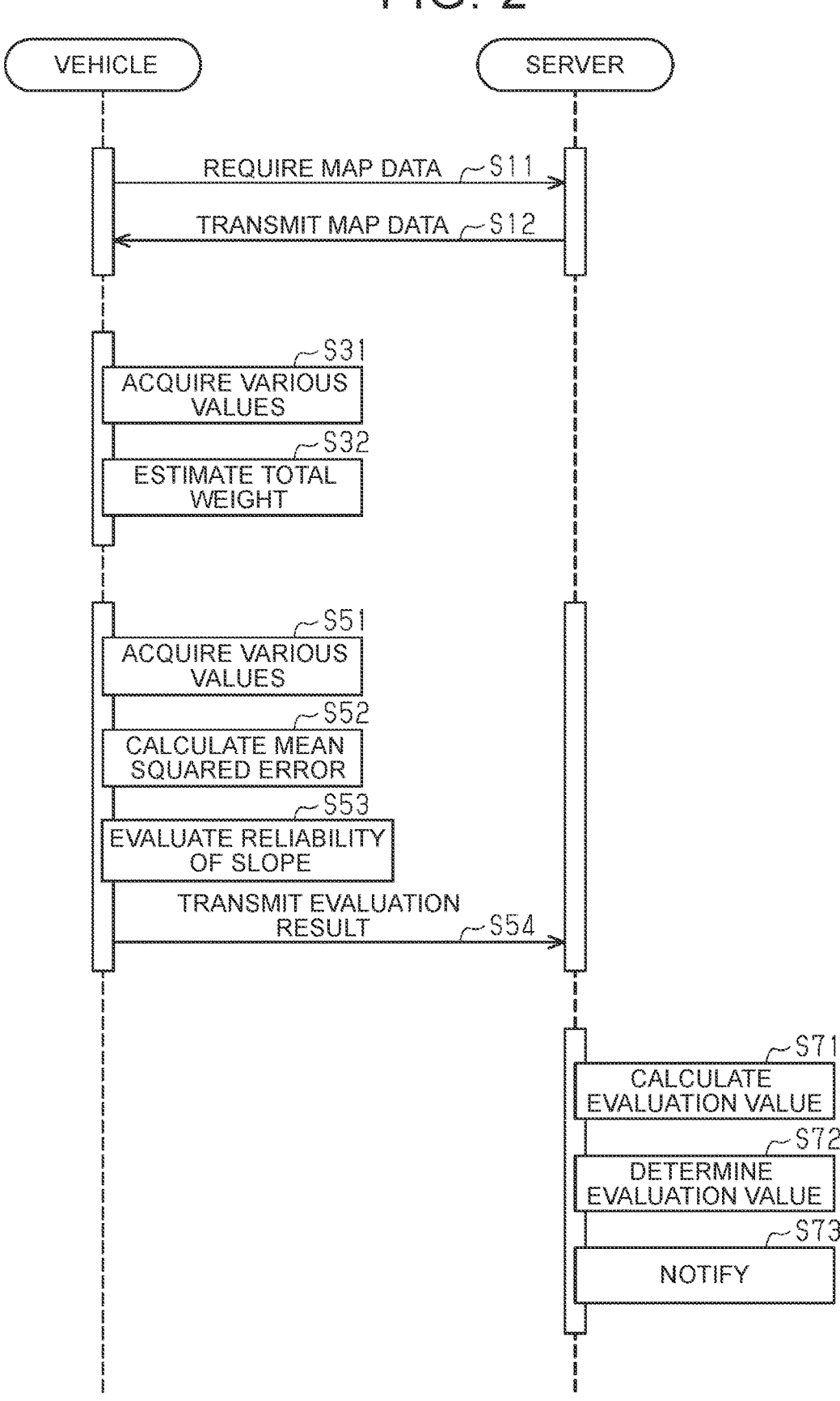
FIG. 2 is a sequence diagram showing acquisition control, estimation control, evaluation control, and determination control.

As shown in FIG. 2, the execution unit 21 of the control device 20 starts the acquisition control, thereby executing a process in step S11. In step S11, the execution unit 21 of the control device 20 transmits a require signal for requiring transmission of the map data DM to the server 50. Then, when the execution unit 51 of the server 50 receives the require signal, the execution unit 51 of the server 50 advances the process to step S12.

In step S12, the execution unit 51 of the server 50 transmits the latest map data DM stored in the storage unit 52 to the control device 20 of the vehicle 10. As a result, the execution unit 21 of the control device 20 acquires the map data DM. At this time, the execution unit 21 stores the map data DM in the storage unit 22. Note that when the storage unit 22 has already stored the map data DM, the execution unit 21 updates the map data DM stored in the storage unit 22 with the latest map data DM acquired in step S12. After step S12, the execution unit 21 ends the current acquisition control.

Estimation Control

Next, the estimation control executed by the vehicle 10 will be described with reference to FIG. 2. The estimation control is control for estimating the estimation value MB of the total weight M of the vehicle 10. In the present embodiment, the control device 20 of the vehicle 10 executes the estimation control as the vehicle 10 travels at a point where a road surface slope AR exists. Specifically, when the position coordinates PC of the vehicle 10 are located within the specific area corresponding to the road surface slope AR, the execution unit 21 of the control device 20 determines that the vehicle 10 is traveling at a point where the road surface slope AR exists.

As shown in FIG. 2, the execution unit 21 of the control device 20 starts the estimation control, thereby executing a process in step S31. In step S31, the execution unit 21 of the control device 20 acquires vehicle driving force FV, traveling resistance RR, the road surface slope AR, and the front-rear acceleration GX at the time of the process in step S31.

Here, the vehicle driving force FV is the actual driving force of the vehicle 10 that is realized according to the target driving force FT. Therefore, for example, the execution unit 21 can acquire the vehicle driving force FV based on torque of the engine and a motor generator as driving sources of the vehicle 10, gear ratio of a transmission and the like, and a radius of the driving wheels of the vehicle 10. In the present embodiment, a unit of the vehicle driving force FV is "N (newton)".

Further, the traveling resistance RR is resistance force including air resistance, rolling resistance, dragging resistance, and the like in conjunction with the traveling of the vehicle 10. Therefore, for example, the execution unit 21 can acquire the traveling resistance RR based on the vehicle speed SP and the like. In the present embodiment, a unit of the traveling resistance RR is "N (newton)". After step S31, the execution unit 21 advances the process to step S32.

In step S32, the execution unit 21 estimates the estimation value MB of the total weight M based on the vehicle driving force FV, the traveling resistance RR, the road surface slope AR, and the front-rear acceleration GX. Note that, as a premise, when the vehicle 10 travels, a relationship of a following equation (1) is satisfied. Furthermore, a relationship of following equations (2) and (3) is well known.

$$\text{Vehicle driving force } FV = \text{inertial resistance } RI + \qquad \text{Equation (1)}$$
$$\text{slope resistance } RG + \text{traveling resistance } RR$$

$$\text{Inertial resistance } RI = \qquad \text{Equation (2)}$$
$$\text{front−rear acceleration } GX \times \text{total weight } M$$

$$\text{Slope resistance } RG = \text{total weight } M \times \qquad \text{Equation (3)}$$
$$\text{gravitational acceleration} \times \sin(\text{road surface slope } AR)$$

Here, the inertial resistance RI is apparent resistance force for movement of the vehicle 10. In the present embodiment, a unit of the inertial resistance RI is "N (newton)".

Further, the slope resistance RG is resistance force due to the slope at the point where the vehicle 10 is located. Note that, for example, when the vehicle 10 is located on an uphill, the slope resistance RG is a positive value. In contrast, for example, when the vehicle 10 is located on a downhill, the slope resistance RG is a negative value. In the present embodiment, a unit of slope resistance RG is "N (newton)".

Furthermore, a following equation (4) is derived based on the equations (1) to (3).

$$\text{Total weight } M = \qquad \text{Equation (4)}$$
$$(\text{vehicle driving force } FV - \text{traveling resistance } RR) \Big/$$
$$\Big(\text{front−rear acceleration } GX +$$
$$\text{gravitational acceleration} \times \sin(\text{road surface slope } AR)\Big)$$

The execution unit 21 estimates the estimation value MB of the total weight M by substituting the vehicle driving force FV, the traveling resistance RR, the road surface slope AR, and the front-rear acceleration GX for the equation (4). At this time, the execution unit 21 stores the estimated estimation value MB in the storage unit 22. Note that the estimation value MB stored in the storage unit 22 is erased when a system of the vehicle 10 is turned off. That is, the estimation value MB is not stored in the storage unit 22 at the time when the system of the vehicle 10 is turned on. In contrast, the initial value MA of the total weight M continues to be stored in the storage unit 22 without being erased even when the system of the vehicle 10 is turned off. In the present embodiment, the process in step S32 is a process for calculating, when traveling at a point where the road surface slope AR has been acquired, the estimation value MB of the total weight M based on the vehicle driving force FV at the point, the front-rear acceleration GX at the point, and the road surface slope AR at the point. After step S32, the execution unit 21 ends the current estimation control.

Evaluation Control

Next, the evaluation control executed by the vehicle 10 and the server 50 will be described with reference to FIG. 2. The evaluation control is control for evaluating reliability of the road surface slope AR used in the estimation control. The evaluation control is executed between a plurality of the vehicle 10 and the single server 50 in parallel. In the present embodiment, as the control device 20 of the vehicle 10 estimates the estimation value MB of the total weight M in the estimation control and calculates the target driving force FT using the estimation value MB, the control device 20 of the vehicle 10 executes the evaluation control for the road surface slope AR that is used for the estimation of the estimation value MB. In other words, the control device 20 executes the evaluation control on a condition that the estimation value MB of the total weight M is stored in the storage unit 22.

As shown in FIG. 2, the execution unit 21 of the control device 20 starts the evaluation control, thereby executing a process in step S51. In step S51, the execution unit 21 of the control device 20 acquires the front-rear acceleration GX as the actual acceleration and target front-rear acceleration GXT that is a target value of the acceleration along the front-rear axis of the vehicle 10, at the time of the process in step S51. Specifically, the execution unit 21 acquires the target front-rear acceleration GXT as follows. For example, in a situation where the driver of the vehicle 10 is operating the accelerator pedal and the like, the execution unit 21 calculates the target front-rear acceleration GXT based on the target driving force FT. In the present embodiment, the execution unit 21 calculates the target front-rear acceleration GXT as a larger value as the target driving force FT becomes larger. Further, for example, in a situation where the driving assistance for the vehicle 10 is realized, the execution unit 21 calculates the same value as the required acceleration from the driving assistance application 22B as the target front-rear acceleration GXT. In this case, the target front-rear acceleration GXT corresponds to the target driving force FT in any case. In the present embodiment, the target front-rear acceleration GXT corresponds to target acceleration. After step S51, the execution unit 21 of the control device 20 advances the process to step S52.

In step S52, the execution unit 21 of the control device 20 calculates a mean squared error MSE of the front-rear acceleration GX and the target front-rear acceleration GXT based on the front-rear acceleration GX acquired for the road surface slope AR at the same point and the target front-rear acceleration GXT. As described above, each point associated with the road surface slope AR is the specific area within the predetermined range. Therefore, when the execution unit 21 repeatedly executes the evaluation control while the vehicle 10 is traveling in the same specific area, the execution unit 21 may acquire a plurality of the front-rear acceleration GX and the target front-rear acceleration GXT for the road surface slope AR at the same point. Then, the execution unit 21 calculates the mean squared error MSE of the front-rear acceleration GX and the target front-rear acceleration GXT based on a pair of the front-rear acceleration GX and the target front-rear acceleration GXT, or two or more pairs of the front-rear acceleration GX and the target front-rear acceleration GXT. In the following, it is assumed that N pairs of data exist as the front-rear acceleration GX and the target front-rear acceleration GXT. Note that "N" is an integer of 2 or more. Further, among N pieces of data, the data are set in order from oldest to newest as data at first time point, data at second time point, . . . data at Nth time point. In step S52, the execution unit 21 calculates a value acquired by squaring difference between the front-rear acceleration GX at the first time point and the target front-rear acceleration GXT at the first time point. Further, the execution unit 21 calculates a value acquired by squaring difference between the front-rear acceleration GX at the second time point and the target front-rear acceleration GXT at the second time point. Similarly to the above, the execution unit 21 calculates a value acquired by squaring difference between the front-rear acceleration GX and the target front-rear acceleration GXT for the third time point to the Nth time point. Then, the execution unit 21 calculates an average value of N values calculated as described above as the mean squared error MSE. In the present embodiment, the mean squared error MSE is calculated based on the value acquired by squaring the difference between the front-rear acceleration GX and the target front-rear acceleration GXT. Therefore, the mean squared error MSE is a value that corresponds to an absolute value of the difference between the front-rear acceleration GX and the target front-rear acceleration GXT. After step S52, the execution unit 21 advances the process to step S53.

In step S53, the execution unit 21 of the control device 20 evaluates the reliability of the road surface slope AR based on the mean squared error MSE. For example, when the mean squared error MSE is equal to or lower than a predetermined prescript error A, the execution unit 21 determines that the reliability of the target road surface slope AR is high. In contrast, when the mean squared error MSE is larger than the prescript error A, the execution unit 21 determines that the reliability of the target road surface slope AR is low. Here, the prescript error A is predetermined by experiment, simulation, and the like as a threshold value for determining whether the mean squared error MSE is acceptably small. After step S53, the execution unit 21 advances the process to step S54.

In step S54, the execution unit 21 of the control device 20 transmits the evaluation result in step S53 that is associated with the road surface slope AR targeted in the evaluation control to the server 50. As a result, the server 50 can acquire the evaluation result in step S53 that is associated with the road surface slope AR targeted in the evaluation control. Note that the server 50 can acquire the evaluation results in step S53 transmitted from a respective control device 20 of one or more of the vehicle 10. When the server 50 receives the evaluation result, the execution unit 51 of the server 50 ends the current evaluation control.

Determination Control

Next, the determination control executed by the server 50 will be described with reference to FIG. 2. The determination control is control for finally deciding the evaluation of the reliability of the road surface slope AR. In the present embodiment, the server 50 executes the determination control every predetermined prescript period. An example of the prescript period is several hours to several days. Note that the server 50 executes the determination control for each road surface slope AR targeted in the evaluation control.

As shown in FIG. 2, the execution unit 51 of the server 50 starts the determination control, thereby executing a process in step S71. In step S71, the execution unit 51 of the server 50 calculates, based on a plurality of the evaluation results in step S53 acquired from the time of the process in step S71 until the prescript period elapses, an evaluation value EV indicating the reliability of the road surface slope AR. For example, the execution unit 51 calculates the evaluation value EV as a higher value as the number of the acquired evaluation results in step S53 that are determined to be high in reliability is larger. Also, the execution unit 51 calculates the evaluation value EV as a lower value as the number of the acquired evaluation results in step S53 that are determined to be low in reliability is larger. After step S71, the execution unit 51 advances the process to step S72.

In step S72, the execution unit 51 of the server 50 finally determines the evaluation of the reliability of the road surface slope AR based on the evaluation value EV. Specifically, when the evaluation value EV is higher than a predetermined prescript value B, the execution unit 51 determines that the reliability of the target road surface slope AR is high. In contrast, when the evaluation value EV is equal to or lower than the prescript value B, the execution unit 51 determines that the reliability of the target road surface slope AR is low. Here, the prescript value B is predetermined by experiment, simulation, and the like as a threshold value for determining whether the evaluation value EV is unacceptably small. After step S72, the execution unit 51 advances the process to step S73.

In step S73, the execution unit 51 of the server 50 notifies the evaluation of the reliability of the road surface slope AR determined in step S72 via a display connected to the server 50 and the like. Therefore, when the evaluation value EV is higher than the prescript value B, the execution unit 51 notifies that the reliability of the target road surface slope AR is high. In contrast, when the evaluation value EV is equal to or lower than the prescript value B, the execution unit 51 notifies that the reliability of the target road surface slope AR is low. After step S73, the execution unit 51 ends the current determination control.

Operations of Present Embodiment

For example, even when the total weight M of the vehicle 10 and the vehicle driving force FV are the same, the actual front-rear acceleration GX changes when the road surface slope AR of the road changes. Therefore, as in the above equation (4), the total weight M of the vehicle 10 can be estimated based on the vehicle driving force FV, the road surface slope AR, the front-rear acceleration GX, and the like.

Effects of Present Embodiment

In step S31 in the estimation control, the execution unit 21 of the control device 20 acquires the vehicle driving force FV, the road surface slope AR, the front-rear acceleration GX, and the like. Then, in step S32, the execution unit 21 estimates the estimation value MB of the total weight M by referring to the vehicle driving force FV, the road surface slope AR, the front-rear acceleration GX, and the like. As a result, the estimation value MB of the total weight M can be estimated accurately.

For example, the total weight M of the vehicle 10 changes depending on the number of occupants boarding on the vehicle 10, the amount of goods loaded on the vehicle 10, and the like. Therefore, if the target driving force FT is calculated using the predetermined initial value MA of the total weight M, the calculated target driving force FT may deviate from the appropriate target driving force FT.

In this regard, when the estimation value MB of the total weight M is stored in the storage unit 22 in the case where the estimation control is executed, the execution unit 21 of the control device 20 calculates the target driving force FT using the estimation value MB instead of the initial value MA as the total weight M. As a result, after the estimation value MB of the total weight M is estimated, the appropriate target driving force FT can be calculated using the estimated estimation value MB.

If the road surface slope AR used in the estimation control is accurate, the estimation value MB of the total weight M estimated based on the road surface slope AR will be an appropriate value. Furthermore, if the road surface slope AR used in the estimation control is accurate, the target driving force FT calculated based on the estimation value MB of the total weight M will also be an appropriate value. As a result, the actual front-rear acceleration GX realized by the target driving force FT becomes a value closer to the target front-rear acceleration GXT. In contrast, if the road surface slope AR used in the estimation control is inaccurate, the actual front-rear acceleration GX realized by the target driving force FT deviates from the target front-rear acceleration GXT.

In this regard, in step S52 in the evaluation control, the execution unit 21 of the control device 20 calculates the mean squared error MSE of the front-rear acceleration GX and the target front-rear acceleration GXT based on the front-rear acceleration GX acquired for the road surface slope AR at the same point and the target front-rear acceleration GXT. In step S53, the execution unit 21 of the control device 20 evaluates the reliability of the road surface slope AR based on the mean squared error MSE. In other words, the execution unit 21 of the control device 20 evaluates the reliability of the road surface slope AR based on the absolute value of the difference between the front-rear acceleration GX and the target front-rear acceleration GXT. As a result, the reliability of the road surface slope AR can be evaluated based on the above characteristics.

In the evaluation control in step S54, the execution unit 21 of the control device 20 transmits the evaluation result in step S53 that is associated with the road surface slope AR targeted in the evaluation control to the server 50. As a result, the server 50 acquires the evaluation result in step S53, so that, for example, an administrator of the server 50 and the like can understand the evaluation result in step S53.

In step S71 in the determination control, the execution unit 51 of the server 50 calculates the evaluation value EV indicating the reliability of the road surface slope AR based on the evaluation results in step S53 transmitted from the respective control device 20 of the one or more of the vehicle 10. Then, in step S72 and step S73, when the evaluation value EV is equal to or lower than the prescript value B, the execution unit 51 notifies that the reliability of the target road surface slope AR is low.

According to the above configuration, reduction of calculation accuracy of the evaluation value EV can be suppressed, for example, compared to when the evaluation value EV is calculated based only on the evaluation result in step S53 transmitted from the control device 20 of the single vehicle 10. In a situation where the reliability of the target road surface slope AR is low, the situation is notified, so that, for example, the administrator of the server 50 and the like can easily execute a process for re-measuring the road surface slope AR and the like.

Modifications

The present embodiment can be realized with the following modifications. The present embodiment and the following modifications can be combined with each other within a technically consistent range to be realized.

In the above embodiment, the evaluation control may be changed. For example, the execution unit 21 of the control device 20 need not execute the process in step S53. In this case, in step S54, the execution unit 21 of the control device 20 may transmit the mean squared error MSE in step S52 that is associated with the road surface slope AR targeted in the evaluation control to the server 50. Then, the execution unit 51 of the server 50 may execute the process in step S53 using the acquired mean squared error MSE.

For example, the execution unit 21 of the control device 20 need not execute the processes in step S52 and step S53. In this case, in step S54, the execution unit 21 of the control device 20 may transmit the front-rear acceleration GX and the target front-rear acceleration GXT in step S51 that is associated with the road surface slope AR targeted in the evaluation control to the server 50. Then, the execution unit 51 of the server 50 may execute the processes in step S52 and step S53 using the acquired front-rear acceleration GX and the target front-rear acceleration GXT.

In the above embodiment, the determination control may be changed. For example, in step S71, the execution unit 51 of the server 50 may store the calculated evaluation value EV in the storage unit 52. Specifically, the execution unit 51 may store the evaluation value EV in association with the road surface slope AR included in the map data DM as the map data DM in the storage unit 52. In this case, by executing the acquisition control, the control device 20 of the vehicle 10 can acquire the evaluation value EV included in the map data DM.

For example, the execution unit 51 of the server 50 may finally determine the evaluation of the reliability of the road surface slope AR based on a plurality of the evaluation results in step S53 acquired from the time of the process in step S71 until the prescript period elapses without calculating the evaluation value EV. As a specific example, the execution unit 51 of the server 50 can determine that the reliability of the target road surface slope AR is high, when the number of the acquired evaluation results in step S53 that are determined to have high reliability is larger than the number of the acquired evaluation results in step S53 that are determined to have low reliability. In contrast, the execution unit 51 of the server 50 can determine that the reliability of the target road surface slope AR is low, when the number of the acquired evaluation results in step S53 that are determined to have high reliability is equal to or lower than the number of the acquired evaluation results in step S53 that are determined to have low reliability.

For example, the execution unit 51 of the server 50 need not execute the process in step S73. Even in this case, when a final determination result of the evaluation of the reliability of the road surface slope AR is stored in the storage unit 52, for example, the administrator of the server 50 and the like can understand the determination result by accessing information on the final determination result stored in the storage unit 52.

In the embodiment described above, a condition for calculating the target driving force FT using the estimation value MB of the total weight M may be changed. As a specific example, when the reliability of the road surface slope AR is determined to be low in step S53 and when the estimation value MB estimated using the road surface slope AR is stored in the storage unit 22, the execution unit 21 may calculate the target driving force FT using the initial value MA as the total weight M.

Figure 3:
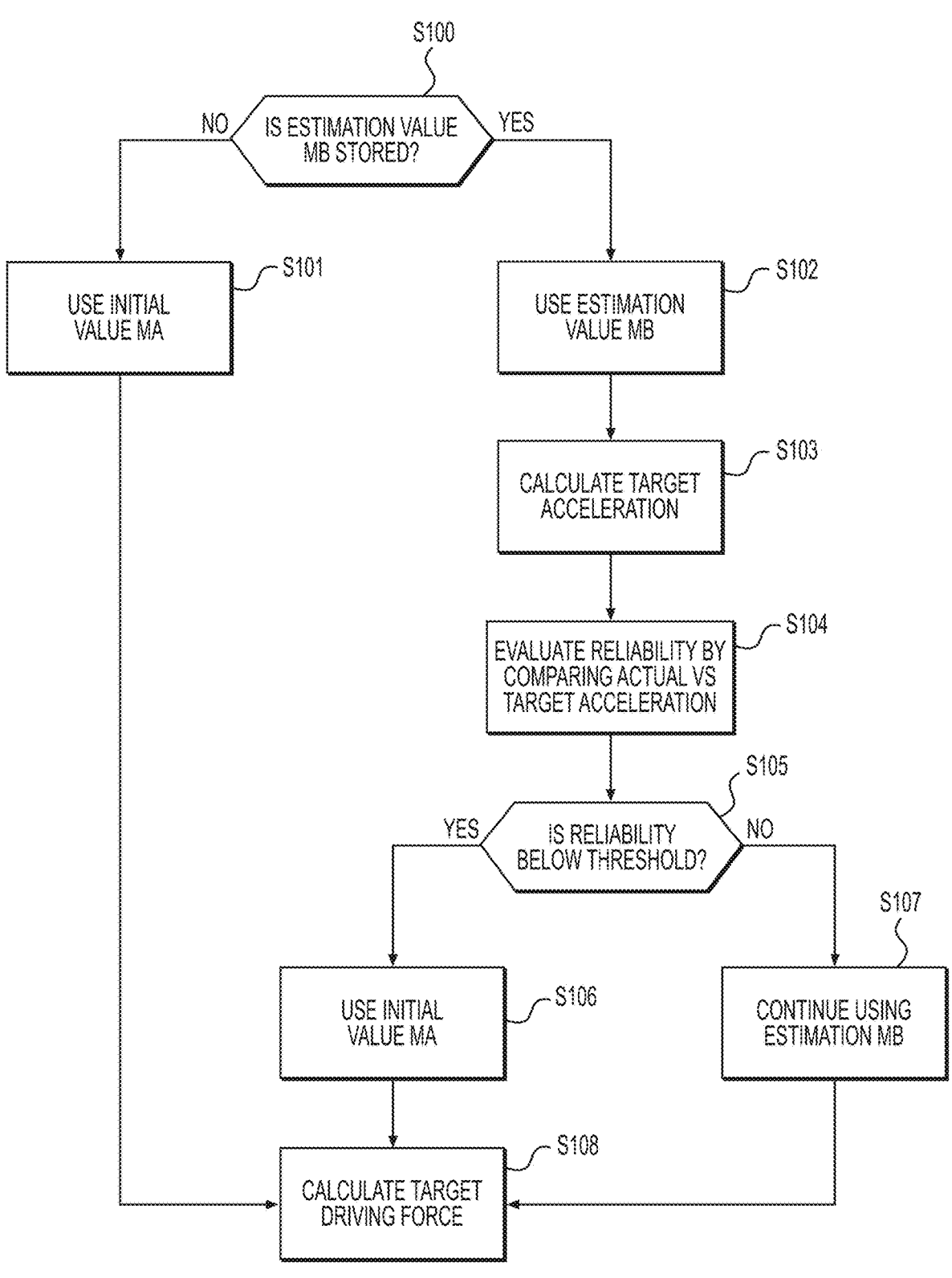
FIG. 3 is a flowchart showing a target driving force calculation process.

FIG. 3 shows a target driving force calculation process executed by the execution unit 21 of the control device 20. In step S100, the execution unit 21 determines whether the estimation value MB of the total weight M is stored in the storage unit 22, as discussed above. When the estimation value MB is not stored (NO in S100), the process proceeds to step S101 where the execution unit 21 uses the initial value MA, as discussed above, and then proceeds to Step S108, discussed below. When the estimation value MB is stored (YES in S100), the process proceeds to step S102 where the execution unit 21 uses the estimation value MB, as discussed above. After Step 102, in step S103, the execution unit 21 calculates the target acceleration corresponding to the target driving force FT, as discussed above. In step S104, the execution unit 21 evaluates the reliability by comparing the actual acceleration with the target acceleration, as discussed above. In step S105, the execution unit 21 determines whether the reliability is below the predetermined threshold value. When the reliability is below the threshold (YES in S105), the process proceeds to step S106 where the execution unit 21 uses the initial value MA, as discussed above. When the reliability is above the threshold (NO in S105), the process proceeds to step S107 where the execution unit 21 continues using the estimation value MB. Finally, in step S108, the execution unit 21 calculates the target driving force FT using the determined total weight value, as discussed above.

What is claimed is:

1. An information processing device for a first vehicle, the information processing device comprising one or more processors configured to execute:
    acquiring vehicle driving force that is driving force of the first vehicle;
    acquiring front-rear acceleration that is an actual measurement value of acceleration along a front-rear axis of the first vehicle from an acceleration sensor mounted on the first vehicle;
    acquiring a slope at each point of a road on which the first vehicle travels; and
    estimating an estimation value of total weight of the first vehicle, when the first vehicle travels at the point where the slope is acquired, based on the vehicle driving force at the point, the front-rear acceleration at the point, and the slope at the point,
    wherein the information processing device further comprises one or more memories configured to store the estimation value and the one or more processors are configured to further execute:
    calculating a target driving force that is a target value of the vehicle driving force;
    calculating, when calculating the target driving force, the target driving force using a predetermined initial value of the total weight under a condition where the estimation value is not stored; and
    calculating, when calculating the target driving force, the target driving force using the estimation value instead of the predetermined initial value under a condition where the estimation value is stored.

2. The information processing device according to claim 1, wherein when the front-rear acceleration acquired from the acceleration sensor is actual acceleration and a target value of the acceleration along the front-rear axis of the first vehicle is target acceleration, the one or more processors are configured to execute: calculating the target acceleration corresponding to the target driving force under the condition where the estimation value is stored; and evaluating reliability of the slope, based on an absolute value of difference between the actual acceleration and the target acceleration.

3. The information processing device according to The information processing device according to wherein under a condition where the reliability of the slope is lower than a predetermined threshold value and the estimation value estimated using the slope is stored, the one or more processors are configured to execute calculating the target driving force using the predetermined initial value.

4. The information processing device according to claim 2, wherein the one or more processors are configured to execute transmitting an evaluation result related to the reliability of the slope to a server.

5. An information processing system, comprising: the information processing device according to claim 4; and
    a server configured to perform wireless communication with the information processing device, wherein the server is configured to execute:
    acquiring a plurality of evaluation results that are transmitted from a plurality of information processing devices of a plurality of vehicles;

calculating an evaluation value indicating a reliability of the slope for each respective vehicle of the plurality of vehicles based on the acquired evaluation results; and notifying that the reliability of the slope is low when the calculated evaluation value is equal to or lower than a predetermined prescript value.

6. The information processing system according to claim 5, wherein the server is configured to link the evaluation value to the slope at each point for each respective vehicle of the plurality of vehicles and transmit the evaluation value to the first vehicle.

\* \* \* \* \*